Aug. 20, 1929.   F. H. PAGE   1,725,473
BOMB DROPPING AND LIKE RELEASE GEAR FOR RELEASING
SUSPENDED BODIES AND MEMBERS UNDER TENSION
Filed Sept. 17, 1928    3 Sheets-Sheet 1

Frederick Handley Page
Inventor

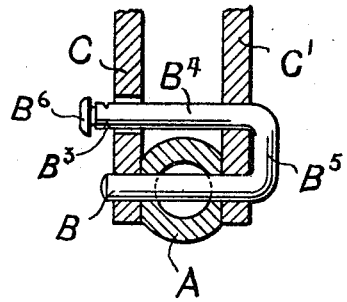
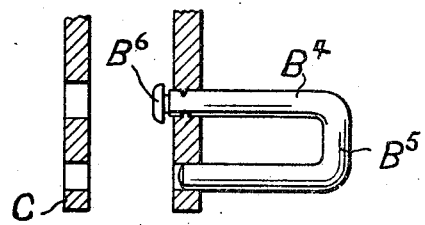
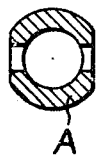
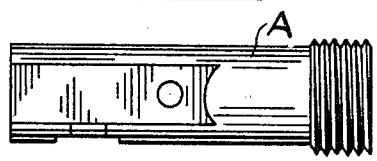
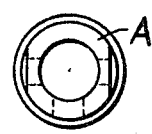
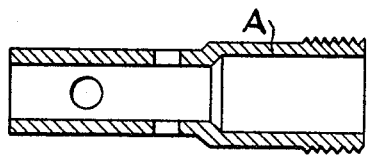
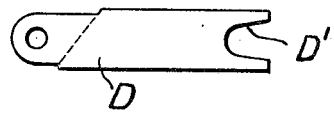
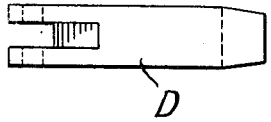

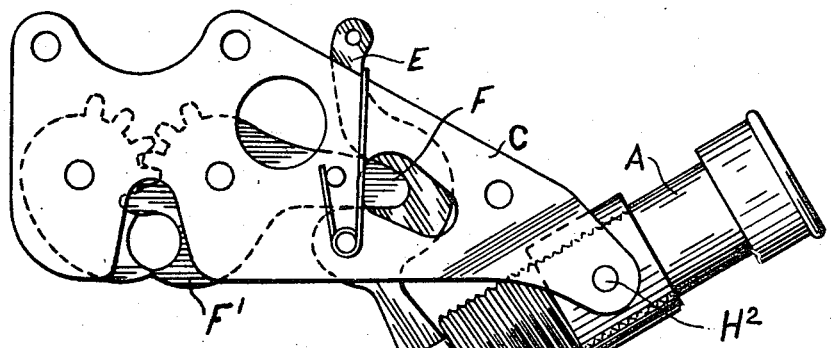
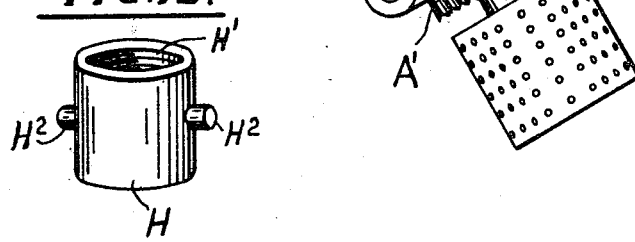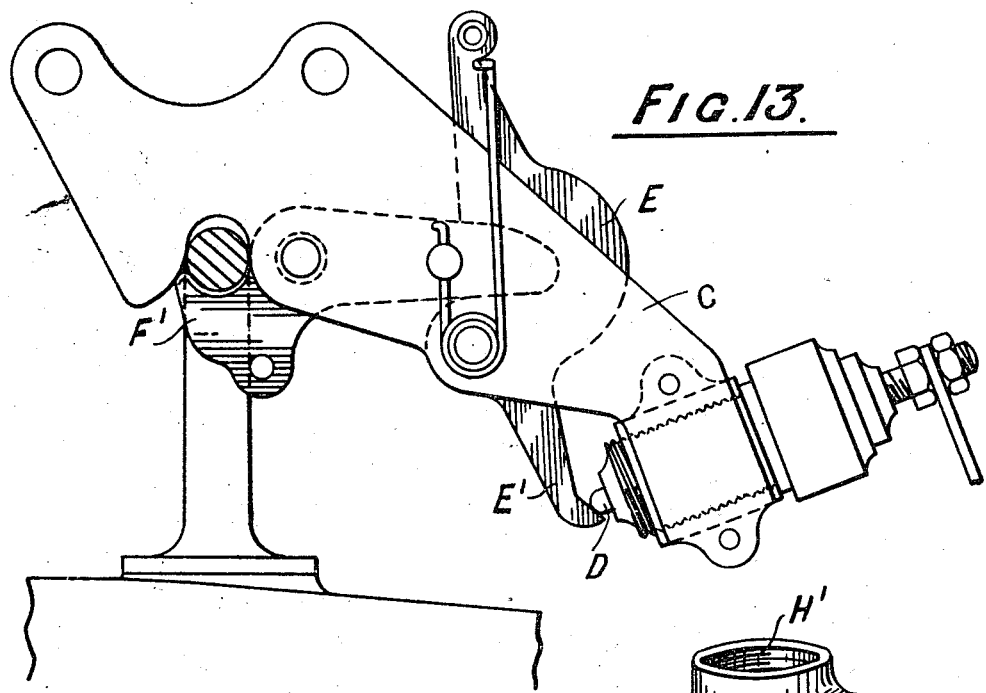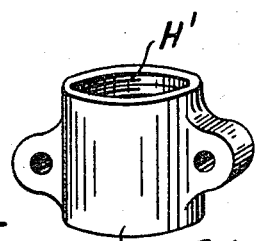

Patented Aug. 20, 1929.

1,725,473

UNITED STATES PATENT OFFICE.

FREDERICK HANDLEY PAGE, OF LONDON, ENGLAND, ASSIGNOR TO HANDLEY PAGE LIMITED, OF LONDON, ENGLAND.

BOMB-DROPPING AND LIKE RELEASE GEAR FOR RELEASING SUSPENDED BODIES AND MEMBERS UNDER TENSION.

Application filed September 17, 1928, Serial No. 306,301, and in Great Britain September 23, 1927.

This invention relates to release gears for releasing weights and members under tension, being particularly applicable for releasing bombs carried by aircraft.

This invention consists of improvements in the control mechanism applicable to my earlier pattern release gears in which the shackle of a bomb or other body was carried by one arm of a pivoted lever or between two pivotally mounted jaws, the said levers or jaws being locked in their closed position by a locking lever. This locking lever was held in its locked position by a spring and was actuated to release the bomb or other body either by direct pull or by the discharge of an explosive cartridge actuating a piston in a cylinder which was rigidly fixed to the frame of the release device, the piston rod operating upon one end of the locking lever to rock it on its pivot to free the supporting lever or jaws carrying the bomb. It has been found that the firing of the cartridge, by which the piston is actuated, quickly fouls the interior of the cylinder and constant cleaning is required to ensure good operation.

The object of the present invention is to obviate this disadvantage and the object is attained broadly by so mounting the cylinder in the frame of the release device that it can be quickly and easily detached from the frame, for cleaning or other purposes.

In order that the invention may be clearly understood reference is made to the accompanying drawings in which three examples of construction, made in accordance with the invention, are illustrated.

Figure 1 is a side elevation of a release gear wherein the cylinder receiving the cartridge is pivotally mounted between the sire plates of the device, and Figure 2 is an elevation partly in section showing the parts in the position assumed when the cartridge has just been fired and the body has been released. Figure 3 is a cross section, on the line X Y of Figure 1, showing the pivotal mounting of the cylinder, and Figures 4 and 5 show the same parts, the cylinder being removed from the side plates. Figures 6, 7 and 8 are respectively, elevation, end view and sectional plan view of the cylinder detached and Figures 9 and 10 are elevation and plan views of the piston.

Figure 11 is an elevation showing an example of construction of a release device wherein the body being carried is supported by two pivotally mounted jaws, the cylinder being carried in a pivotally mounted socket. Figure 12 shows the socket detached.

Figure 13 is an elevation of an example of construction showing the cylinder carried in a socket rigidly fixed between the side plates, and Figure 14 is a detail of the socket detached.

Figure 1:
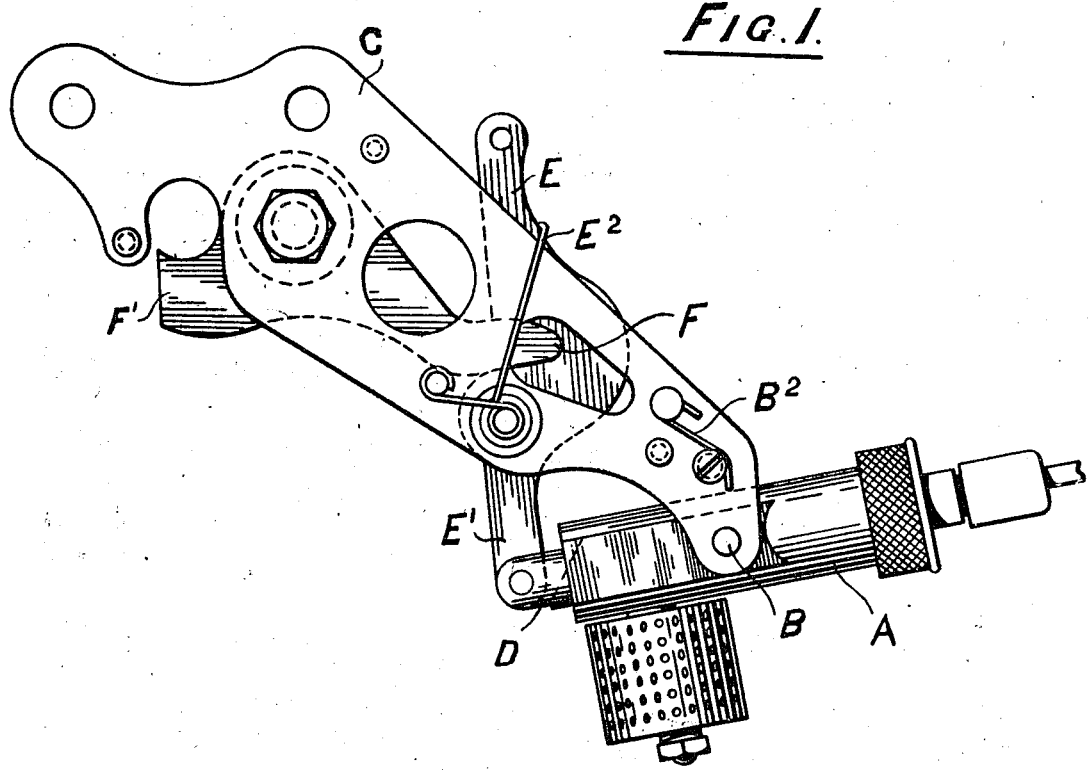
Figure 2:
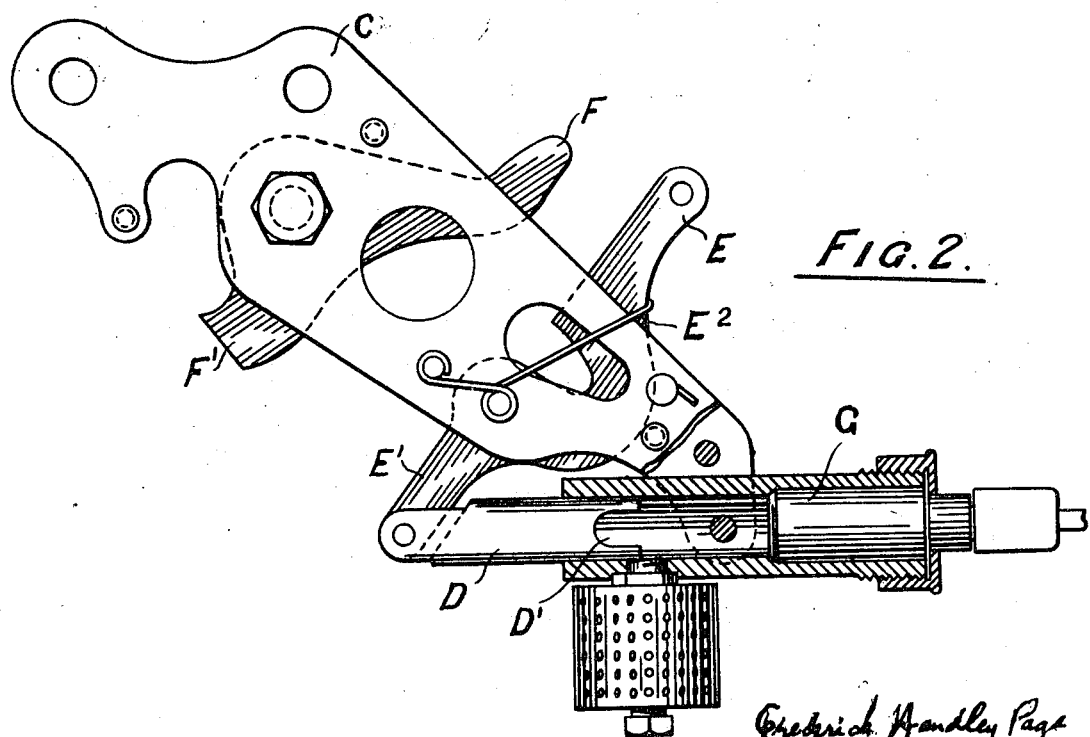

According to the first example of construction as illustrated in Figures 1-10, A is the cylinder which is pivoted on a pin B situated approximately at the centre of the length of the cylinder A between side plates C and $C^1$ forming the main structural device. The pin B upon which the cylinder A is pivoted, passes through the side plates C, $C^1$ of the release device and transversely through the cylinder A and is held in position by a spring catch $B^1$ which presses into an indent $B^3$ in a branch $B^4$ of the pin B.

It will be observed that the pin B, as illustrated, is of U form with two parallel portions connected by an angular portion $B^5$. The branch $B^4$ which is parallel to the main portion of the pin which the cylinder A oscillates, passes through an enlarged aperture $C^2$ in the side plate C, the aperture being large enough to allow a head $B^6$ on the branch $B^4$ to pass through. This enables the U-shaped pin to be slidden from the position shown in Figure 3 to the position shown in Figure 4 where the head $B^6$ is stopped by the inner wall of the side plate $C^1$. This permits the cylinder A to be released from the pin B when the said cylinder A may be disconnected from the plates C, $C^1$. The cylinder A carries a piston D which is formed with a recess or slot $D^1$ to enable the said piston D to reciprocate the required distance within the cylinder A past the pin B.

The piston B extends beyond the cylinder A, and is pivotally connected at its remote end to one arm $E^1$ of the locking lever E forming the release catch. The locking lever E when turned on its pivot against the action of a spring $E^2$, disengages the end of a pivot lever F which carries a jaw $F^1$ for supporting the article to be released.

G is an explosive cartridge which may be fired by any suitable means when it is required to release the device. When firing takes place, the piston D travels outwards causing the cylinder A slightly to swivel on the pin B upon which it is pivoted, and rocks the locking lever E about its pivot, so freeing the lever or jaws F¹ supporting the bomb or other body being carried.

To remove the cylinder A for the purpose of being cleaned, the pin B, upon which it is mounted is freed from its spring catch B¹ by the hand of the operator and is withdrawn to enable the cylinder A to be slidden from between the plates, C, C¹ forming the main structure and from off the piston D which remains pivotally attached to one end of the locking lever E.

The further embodiment of the invention illustrated in Figures 11 and 12 consists of a socket or nut H located between the two plates C, C¹ forming the main structure of the device, which socket H is interiorly screwthreaded at H¹ and receives one end of the detachable cylinder A, which is exteriorly screwthreaded at A¹. The socket H in this construction is mounted between the plates C, C¹ and is carried on trunnions H² formed on the socket H which permit of oscillation of the cylinder A. The end of the cylinder A may be screwed down into the socket H, where it is secured rigidly in position. After the charge has been fired, the cylinder A can be readily removed for inspection or cleaning by unscrewing from the socket H.

The socket or nut which receives the screwthreaded end of the cylinder may be pivotally mounted between the side plates to allow the cylinder to oscillate as above described, or the socket or nut may be rigidly fixed between the side plates as illustrated in Figures 13 and 14.

In this construction the trunnions H² are dispensed with and the necessary change in angle between the piston D and the arm E¹ of the lever E is effected by shaping the face of the arm E¹ suitably to permit of the end of the piston D sliding on the said face of the arm E¹.

The socket and the end of the cylinder, instead of being screwthreaded may be formed with a bayonet joint or any other convenient male and female connection. It will also be readily appreciated that by any of the above embodiments of the invention the cylinder may be readily and conveniently detached for the purposes of cleaning or the like.

What I claim as my invention and desire to secure by Letters Patent is:—

1. Release gear for releasing members under tension, comprising in combination a frame adapted for attachment to an aircraft and containing a pivoted jaw adapted to hold and release the member under tension, a pivoted locking lever adapted to hold and release the pivoted jaw, a cylinder detachably connected to the frame and containing a piston in such cylinder adapted to be thrust outwards under the action of a cartridge fired in the cylinder, a longitudinally sliding pivot pin having two parallel portions passing through the frame and one portion of such pin passing through the cylinder and forming a pivot pin on which said cylinder is adapted to rock, such piston being adapted to engage and rock the locking lever when thrust outwards by the fired cartridge, all constructed to release the member under tension when the said cartridge is fired.

2. Release gear for releasing members under tension, comprising in combination, a frame adapted for attachment to an aircraft and containing a pivoted jaw adapted to hold and release the member under tension, a pivoted locking lever adapted to hold and release the pivoted jaw, a cylinder detachably connected to the frame and containing a piston in such cylinder adapted to be thrust outwards under the action of a cartridge fired in the cylinder, a longitudinally sliding pivot pin passing through the frame and through the cylinder on which pivot pin said cylinder is adapted to rock, means to permit the pivot pin being withdrawn from the cylinder but not to be detached from the frame, such piston being adapted to engage and rock the locking lever when thrust outwards by the fired cartridge, all constructed to release the member under tension when the said cartridge is fired.

In witness whereof I have hereunto set my hand.

FREDERICK HANDLEY PAGE.